US011074438B2

(12) United States Patent
Mangalam et al.

(10) Patent No.: US 11,074,438 B2
(45) Date of Patent: Jul. 27, 2021

(54) DISENTANGLING HUMAN DYNAMICS FOR PEDESTRIAN LOCOMOTION FORECASTING WITH NOISY SUPERVISION

(71) Applicants: TOYOTA RESEARCH INSTITUTE, INC.; THE BOARD OF TRUSTEES OF THE LELAND STANFORD JUNIOR UNIVERSITY, Stanford, CA (US)

(72) Inventors: Karttikeya Mangalam, Stanford, CA (US); Ehsan Adeli-Mosabbeb, Mountain View, CA (US); Kuan-Hui Lee, San Jose, CA (US); Adrien Gaidon, Mountain View, CA (US); Juan Carlos Niebles Duque, Mountain View, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 73 days.

(21) Appl. No.: 16/590,275

(22) Filed: Oct. 1, 2019

(65) Prior Publication Data
US 2021/0097266 A1    Apr. 1, 2021

(51) Int. Cl.
G06K 9/00    (2006.01)
G06N 3/08    (2006.01)
G06T 7/20    (2017.01)

(52) U.S. Cl.
CPC ..... *G06K 9/00342* (2013.01); *G06K 9/00744* (2013.01); *G06K 9/00805* (2013.01); *G06N 3/08* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 2018/0129937 A1 | 5/2018 | Bradbury et al. | |
| 2020/0160535 A1* | 5/2020 | Ali Akbarian | G06N 7/005 |

OTHER PUBLICATIONS

Fragkiadaki, et al., "Recurrent Network Models for Human Dynamics," IEEE Int'l Conf. on Computer Vision (ICCV), Sep. 29, 2015.
Martinez, et al., "On Human Motion Prediction Using Recurrent Neural Networks," IEEE Conf. on Computer Vision and Pattern Recognition (CVPR), Jul. 21-26, 2017.
Nescher, et al., "Analysis of Short Term Path Prediction of Human Locomotion for Augmented and Virtual Reality Applications," 2012.
Fushishita, et al., "Long-Term Video Generation of Multiple Futures Using Human Poses," arXiv:1904.07538v2, Apr. 17, 2019.

* cited by examiner

*Primary Examiner* — Leon Flores
(74) *Attorney, Agent, or Firm* — Seyfarth Shaw LLP

(57) ABSTRACT

A method for predicting spatial positions of several key points on a human body in the near future in an egocentric setting is described. The method includes generating a frame-level supervision for human poses. The method also includes suppressing noise and filling missing joints of the human body using a pose completion module. The method further includes splitting the poses into a global stream and a local stream. Furthermore, the method includes combining the global stream and the local stream to forecast future human locomotion.

11 Claims, 8 Drawing Sheets

US 11,074,438 B2

DISENTANGLING HUMAN DYNAMICS FOR PEDESTRIAN LOCOMOTION FORECASTING WITH NOISY SUPERVISION

BACKGROUND

Field

Certain aspects of the present disclosure generally relate to vehicle notifications and, more particularly, to a system and method for disentangling human dynamics for pedestrian locomotion forecasting with noisy supervision.

Background

Pedestrians are one of the most venerable and prevalent entities in self-driving scenarios. The ability to predict their dynamics in the near future can assist in making proper decisions for a next action of a vehicle (e.g., an immediate next action). Forecasting human locomotion can be useful in downstream tasks for self-driving cars. For example, human locomotion forecasts can be used to reason about pedestrian behavior and path planning. Human dynamics or locomotion can be defined in terms of the joint spatial movement of several key points on the human body. It is the final product of an interaction between large scale trajectorial motion and finer body limb movements.

Developing computational methods for modeling human dynamics and forecasting how a pose might change in the future is a challenging task. The first level of complexity comes from the inherent multimodal nature of pedestrian locomotion distribution. The space of possible future locomotion is both complex and uncertain, even when conditioned on an observed history. In addition to this difficulty, in real scenarios, the pedestrians often occlude with each other or other objects in the scene. Moreover, obtaining full annotations of the dynamics, including egomotion (self-vehicle movements) as well as pedestrian trajectory and pose, is an intensive task.

SUMMARY

In one aspect of the present disclosure, a method for predicting spatial positions of several key points on a human body in the near future in an egocentric setting is described. The method includes generating a frame-level supervision for human poses. The method also includes suppressing noise and filling missing joints of the human body using a pose completion module. The method further includes splitting the poses into a global stream and a local stream. Furthermore, the method includes combining the global stream and the local stream to forecast future human locomotion.

In another aspect of the present disclosure, a non-transitory computer-readable medium with non-transitory program code recorded thereon is disclosed. The program code is for predicting spatial positions of several key points on a human body in the near future in an egocentric setting. The program code is executed by a processor and includes program code to generate a frame-level supervision for human poses. The program code also includes program code to suppress noise and filling missing joints of the human body using a pose completion module. The program code further includes program code to split the poses into a global stream and a local stream. Furthermore, the program code includes program code to combine the global stream and the local stream to forecast future human locomotion.

Another aspect of the present disclosure is directed to a system for predicting spatial positions of several key points on a human body in the near future in an egocentric setting. The system having a memory and one or more processors coupled to the memory. The processor(s) is configured to generate a frame-level supervision for human poses. The processor(s) is also configured to suppress noise and filling missing joints of the human body using a pose completion module. The processor(s) is further configured to split the poses into a global stream and a local stream. Furthermore, the processor is configured to combine the global stream and the local stream to forecast future human locomotion.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
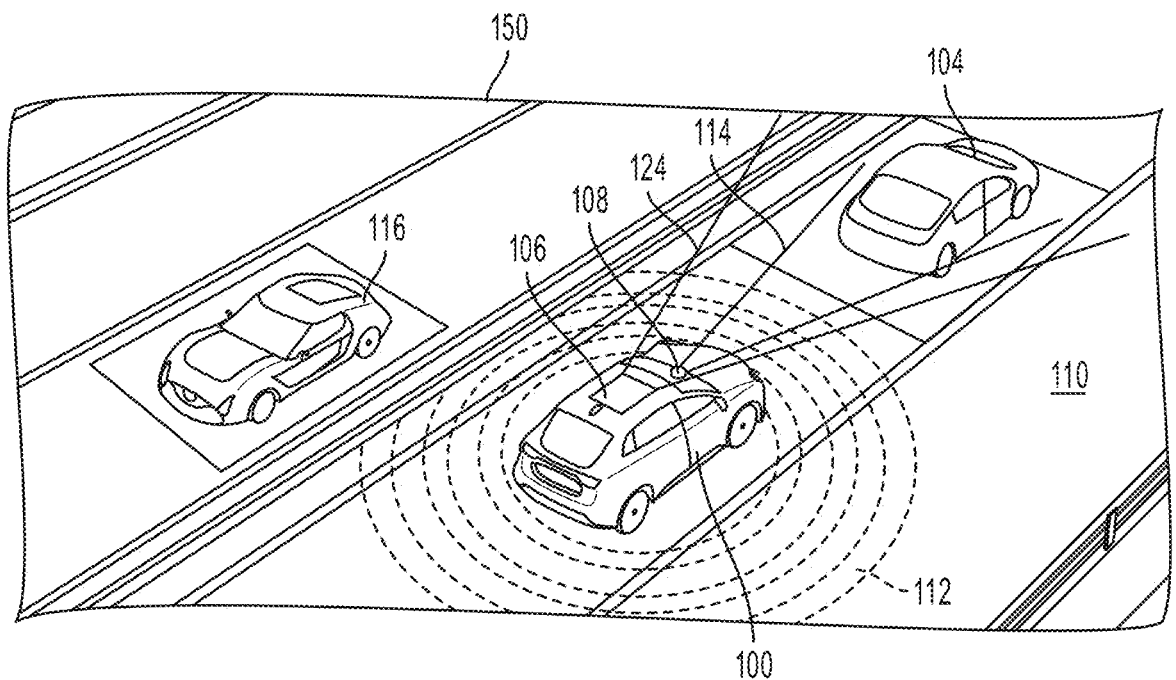
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Pedestrians are one of the most venerable and prevalent entities in self-driving scenarios. The ability to predict their dynamics in the near future can assist in making proper decisions for immediate next action the vehicle needs to take. Forecasting human locomotion can be useful in several downstream tasks for self-driving cars such as reasoning about pedestrian behavior and path planning.

Human dynamics or locomotion can be defined in terms of the joint spatial movement of several key points on the human body. For example, human locomotion is a final product of a complex interaction between large scale trajectorial motion and finer body limb movements. Conventional systems focus on either large scale trajectorial motion or finer body limb movements.

Aspects of the present disclosure are directed to predicting human locomotion by disentangling the global and local components. A challenge in achieving the aspects of the present disclosure includes a scarcity of human annotated pedestrian pose datasets in an egocentric view. To overcome this challenge, in one configuration models are used to generate noisy ground-truth data for training a model. These models may be off-the-shelf models.

In one configuration, the task of forecasting human locomotion in an egocentric view (of the vehicle) is framed as a sequence-to-sequence problem. At a first stage, models for multiple-person key-point detection module are used to autonomously generate dense but noisy frame-level supervision for human poses. For each frame in the video, masked frames are generated by masking everything except the pedestrians. These masked frames are then processed through a pre-trained pose detection model (e.g., OpenPose) to generate poses or pose labels for every pedestrian in the frame.

Pre-trained pose detectors, such as off-the-shelf pose detectors, often result in noisy detection of key points. In addition, the pose detector may not detect one or more key points. The key points may be missed for completely visible occlusion-free pedestrians in the frame. Thus, at a second stage, a pose completion network is used for completing the detected human poses obtained from the pre-trained pose detection model. For example, an auto-encoder may be used for noise suppression and filling in missing joints.

After suppressing the noise via the auto-encoder and filling in the missing joints, the overall pose locomotion sequence is disentangled into two streams (e.g., a global motion stream and a local motion stream). The global motion stream encodes the overall rigid body motion of the pedestrian. Specifically, the global motion stream models large scale movements of the pedestrian position with respect to a camera on the vehicle. A neck joint sequence may represent the global stream. An encoder-recurrent-decoder architecture may be used for forecasting the global stream.

The local motion stream encodes the motion of the body of the pedestrian with respect to the global stream. The local motion stream captures the effect of depth change on the overall pose size and the movement of different joints of the pedestrian, such as a small repetitive motion of swinging arms. An architecture of a local stream forecaster is different from an architecture of a global stream forecaster. The local and future predictions are combined to forecast the overall human locomotion.

FIG. 1 illustrates an example of a vehicle 100 (e.g., ego or host vehicle) in an environment 150 according to aspects of the present disclosure. In the present example, the vehicle 100 is an autonomous vehicle. As shown in FIG. 1, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may evaluate a driving environment. For example, the information obtained from the sensors 106, 108 may identify objects in the vehicle's 100 blind spots. The information may generate one or more localized notifications.

Figure 2:
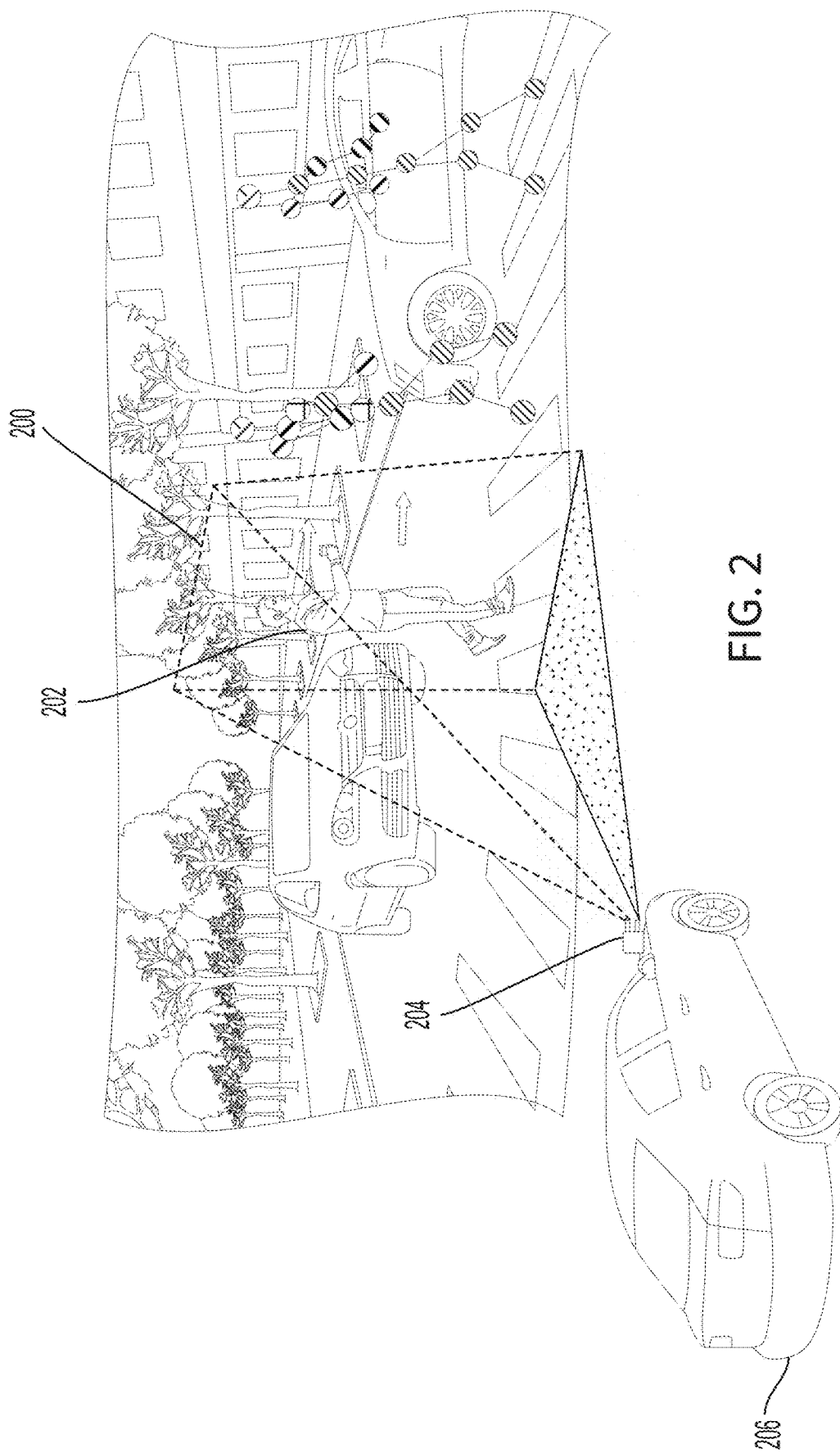
FIG. 2 illustrates an egocentric view of the vehicle for pedestrian locomotion forecasting.

FIG. 2 illustrates an egocentric view (of the vehicle) 200 for pedestrian locomotion forecasting. Locomotion is defined as an overall motion of several key points on the pedestrian 202 in contrast to predicting just the position (trajectory prediction) or the pose (pose forecasting). Specifically, global motion stream models large scale movements of the pedestrian position with respect to a camera 204 on the vehicle 206.

Figure 3:
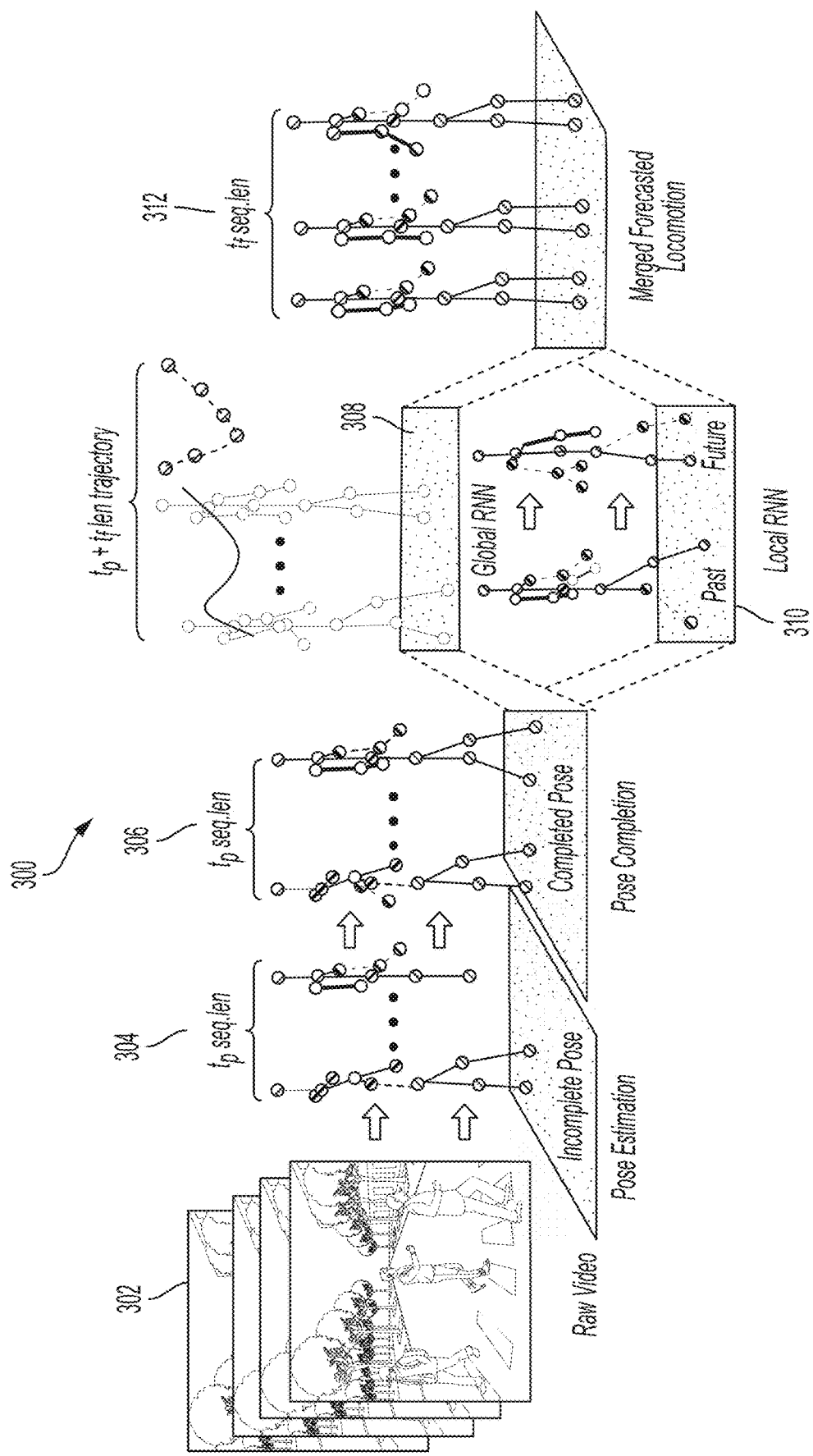
FIG. 3 illustrates a method for human locomotion forecasting with noisy supervision, according to one aspect of the disclosure.

FIG. 3 illustrates human locomotion forecasting 300 (e.g., corresponding to a pedestrian locomotion forecasting module) with noisy supervision, according to one aspect of the present disclosure. The human locomotion forecasting 300 includes a raw video 302, an incomplete pose plane 304, a complete pose plane 306, a global stream plane 308, a local stream plane 310, and a merged forecasted locomotion plane 312.

Aspects of the present disclosure frame the task of forecasting human locomotion in an egocentric view as a sequence-to-sequence problem. The egocentric view may be a view of a vehicle or robotic device, such as an autonomous car. In one configuration, $p_t$ denotes a human or pedestrian pose at time t, which includes d two-dimensional joints. For example, $$P_t = \{(x^i, y^i)\}_{i=1}^{d} \qquad 1$$

Where $x^i$, $y^i$ are distinct points (e.g., two dimensional vectors) with coordinates in a two-dimensional plane and d is the number of distinct points.

Forecasting human locomotion is defined as: given $t_p$ previous poses, $$\{p_i\}_{i=t-t_p+1}^{t} = \{p_{t-t_p+1}, \ldots, p_t\} \qquad 2$$

predict the position of each of these joints for $t_f$ future frames. That is, predict the sequence $$\{p_i\}_{i=t+1}^{t_f} = \{p_t+1, \ldots, p_t+t_f\} \qquad 3$$

In one aspect, noisy pose estimates are generated from models that are pre-trained. The missing and low confidence joints are filled in using the pose completion module or neural network. For example, the complete pose plane 306 denotes an output of the pose completion module with filled in joint positions. The completed poses are split into global and local streams that are forecasted using quasi recurrent neural networks in an encoder-recurrent-decoder style pose prediction module. Concurrent motions are separated by splitting the completed poses into global and local streams. The predictions from the global and local streams are combined (e.g., merged) to predict or forecast future pedestrian locomotion.

For example, models for multiple-person key-point detection module is used to autonomously generate dense but noisy frame-level supervision for human poses $p_t$. The models may be pre-trained on other task specific datasets and are used to infer pose and depth on datasets of the present disclosure.

For each frame in the video, masked frames are generated by masking everything except the pedestrians. The masked frames are processed through a pre-trained pose detection model (e.g., OpenPose) to generate pose labels for every pedestrian in the frame. For example, the incomplete pose plane 304 from the raw video 302 represents a noisy input pose sequence with missing joint detection. Using masked full frames for generating frame-level pose supervision is faster and requires significantly lesser storage (up to 100 times lesser) than processing each cropped out pedestrian one by one without any observable decrease in pose detection accuracy.

For the $i^{th}$ joint detected in the $t^{th}$ frame, the pose detection model detects two dimensional (2D) coordinates ($x_t^i$, $y_t^i$) and provides confidence scores $C_t^i$, which are used for denoising these detections. For example, the labeled keypoints form a human pose comprised of d equal to twenty five (25) joints.

The missing and low confidence joints are filled in using the pose completion module or neural network. Pre-trained pose detectors (e.g., the pre-trained pose detection model) often result in noisy detection of key points. In addition, the pose detector may miss detecting some key points, even for a completely visible occlusion-free pedestrian in the frame. For example, because of the small scale and off coplanar orientation of pedestrians in real-world two dimensional (2D) videos, the pose detector may miss detecting some key-points.

Thus, at a second stage, a pose completion network (e.g., associated with the complete pose plane 306) is used for completing the detected human poses obtained from the pose detection model. For example, an auto-encoder may be used for noise suppression and filling in the low confidence output with more accurate estimates. The auto-encoder may also fill in missing joints or missing data that are not detected by the pose detection module. Further, the auto-encoder may decompose the motion with noisy data in order to separate the global and local components of the motion. Otherwise, the process of separating the local and global components of the motion would be perplexing as the joints flicker frequently.

After noise suppression using the auto-encoder and filling in the missing joints, the overall pose locomotion sequence is disentangled into two streams (e.g., global and local). A global motion stream encodes the overall rigid body motion of the pedestrian. Specifically, the global motion stream models large scale movements of the pedestrian position with respect to a camera on the vehicle. The neck joint sequence may represent the global stream. A global recurrent neural network 308 (e.g., an encoder-recurrent-decoder architecture) may be used for forecasting the global stream.

The local motion stream encodes the motion of the body with respect to the global stream. The local motion stream captures the effect of depth change on the overall pose size and the movement of different joints of the pedestrian, such as a small repetitive motion of swinging arms. A local recurrent neural network 310 (e.g., an encoder-recurrent-decoder architecture) may be used for forecasting the local stream. The architecture of the local stream forecaster is different from the architecture of the global stream forecaster. The local and future predictions are combined to forecast the overall human locomotion. The result of the merging is shown in the merged forecasted locomotion 312.

Figure 4:
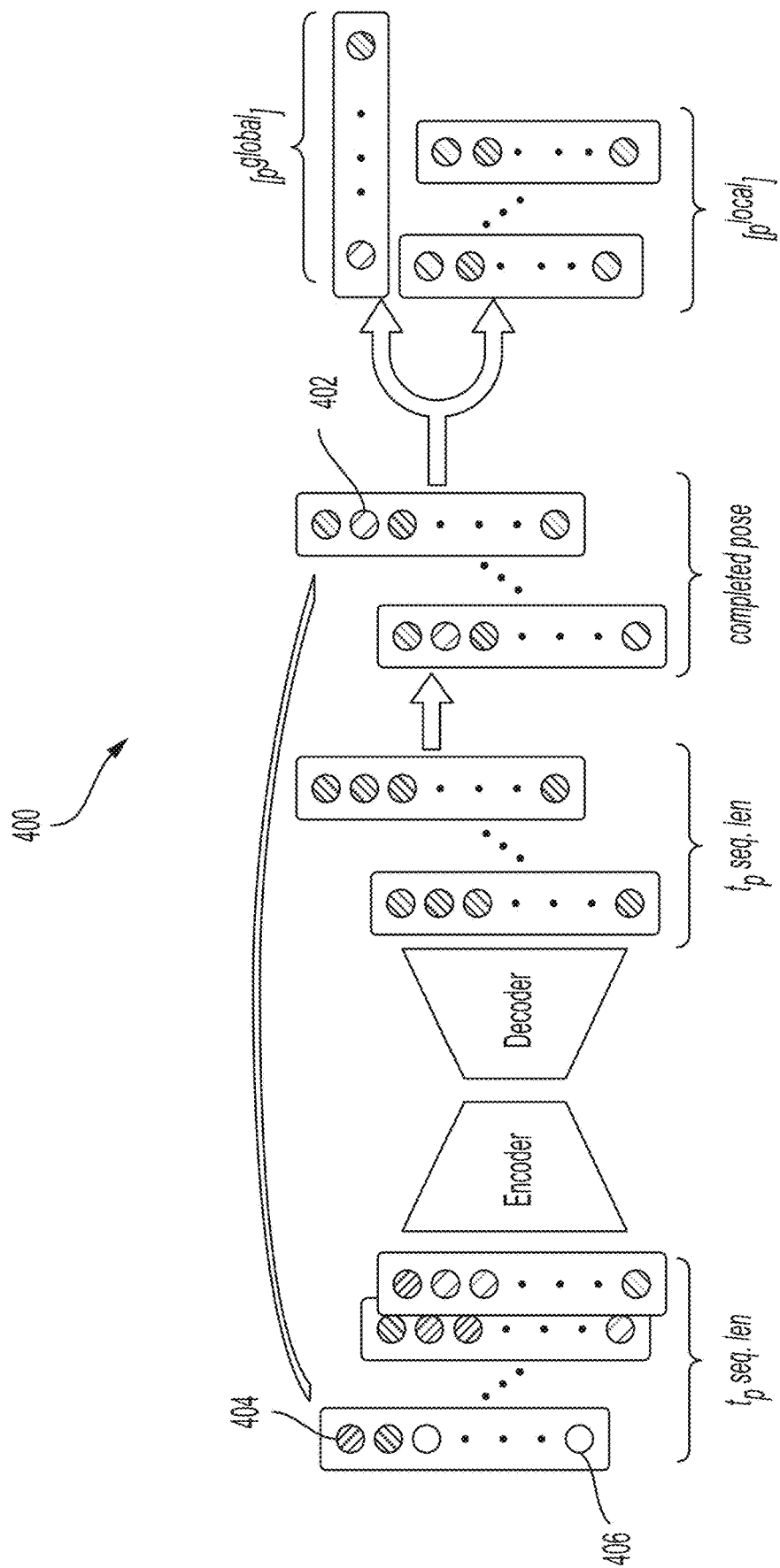
FIG. 4 illustrates a network architecture for completing the detected human poses and for disentangling global and local streams, according to aspects of the present disclosure.

FIG. 4 illustrates a network architecture 400 for completing the detected human poses and for disentangling the global and local streams, according to aspects of the present disclosure. In one aspect, the network architecture 400 may be a pose completion and disentangling module. As shown in FIG. 4, for illustrative purposes, a shade of a circle 402 represents the confidence in locating a joint. For example, the darkest shade 404 represents the highest confidence and the lightest shade 406 (e.g., white) represents missing data. Detections below a threshold confidence $\alpha_c$ are replaced with auto-encoder estimates.

The pose completion module includes an auto-encoder (e.g., an over-complete symmetric auto encoder). The network architecture 400 is trained on a subset of total training data that has been assigned high confidence scores by the pose detection model. For example, the poses are filtered using thresholds on confidence scores of the pose detection model to only include the examples with $c_t^i > \alpha_c$, $\forall$ i $\in$ {1, ... d}. Where $c_t^i$ corresponds to confidence scores and $\alpha_c$ is a threshold confidence $\alpha_c$.

These high confidence examples are then used to train a symmetric auto-encoder with dropout that embeds the two-dimensional vectors $p_t$ to a latent dimension $d_{ae}$. This operation embeds the pose information into a ten dimensional space. Each pose data is mapped to a unique point in this embedding space and then mapped back to the denoised detections $p_t$. Training with dropout in the input layer, on high confidence examples, models the effect of missing data. Furthermore, supervising a loss function with generated high confidence data (treated as ground-truth) on these good examples and the information bottleneck in the form of a narrow layer in the middle of the network allows the model to learn to reconstruct the complete pose even if some of the joints are missing.

The trained auto-encoder is used to estimate a full pose on all the low confidence noisy detections from the pose detection module associated with the incomplete pose plane 304. These estimates are used to fill in the missing and low confidence joint detections based on their confidence values. Mathematically this is represented as:

$$(x_t^i, y_t^i) \leftarrow (\hat{x}_t^i, \hat{y}_t^i) \forall (i,t) \text{ such that } c_t^i \leq \alpha_c \qquad 4$$

Where $\hat{x}_t^i, \hat{y}_t^i$ is a mapping of $x_t^i, y_t^i$ for all values of (i, t) such that $c_t^i \leq \alpha_c$.

The network architecture 400 also disentangles pedestrian locomotion into global and local streams. After noise suppression using the auto-encoder and filling in the missing joints, the overall pose locomotion sequence $\{p_j\}_{j=t-t_p+1}^{t}$ is disentangled into two streams, a global motion stream and a local motion stream. The global motion stream encodes the overall rigid body motion of the pedestrian as $\{p_j^{global}\}_{j=t-t_p+1}^{t}$.

The local motion stream encodes the motion of the body with respect to the global stream as $\{p_j^{local}\}_{j=t-t_p+1}^{t}$. These separate streams capture different granularities of simultaneous concurrent motion and are modeled and forecasted separately. The global motion stream $p^{global}$ models large scale movements of the pedestrian position with respect to the camera, such as those caused by the trajectory or egocentric motion of the camera mounted on the moving car, etc. The local motion stream captures the effect of depth change on the overall pose size and the movement of different joints of the pedestrian with respect to the global motion stream. For example, the local motion includes small repetitive motions like swinging of arms.

Consider for example, an actual path $\{p_j\}_{j=t-t_p+1}^{t+t_f}$ traced by an elbow of the pedestrian through space. In an original formulation, this trajectory is complex and includes several swirls generated from gyrating around the shoulder and drifting with the rest of the body. The disentangling significantly reduces the overall complexity, because each of the streams now model a much simpler and easier to predict motion.

In some aspects, the neck joint sequence denoted by $(x_j^{\tilde{I}}, y_j^{\tilde{I}})_{j=t-t_p+1}^{t}$ is used as a representation of the global stream, because the neck is the most widely observed joint in the dataset. This representation is possible only after filling in the missing data. The local stream $\{p^{local}\}$ is then derived by re-parameterizing the original stream $p_t$ as:

$$(x_t^{local,i}, y_t^{local,i}) = (x_t^i, y_t^i) - (x_t^{\tilde{I}}, y_t^{\tilde{I}}) \qquad 5$$

$\forall i \in \{1, \ldots, d\}, i \neq \tilde{I}, t \in \{t-t_p+1, \ldots, t\}$ The completed poses are then split into global and local streams that are forecasted using a recurrent neural network (e.g., quasi recurrent neural networks) in an encoder-recurrent-decoder style pose prediction module. These predictions are combined to forecast future pedestrian locomotion.

Figure 5A:
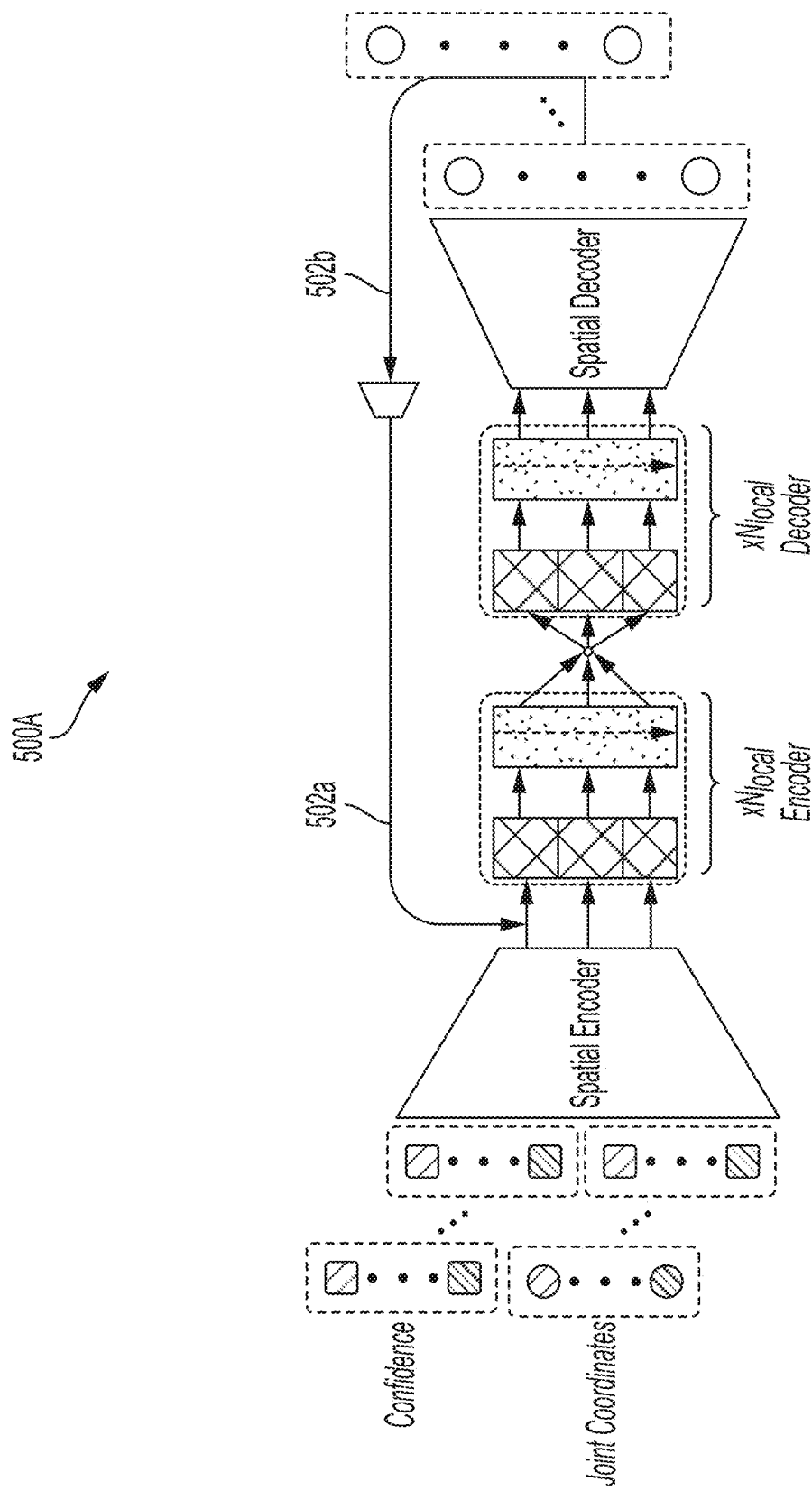
FIG. 5A illustrates an architecture for local stream forecasting, according to aspects of the present disclosure.
Figure 5B:
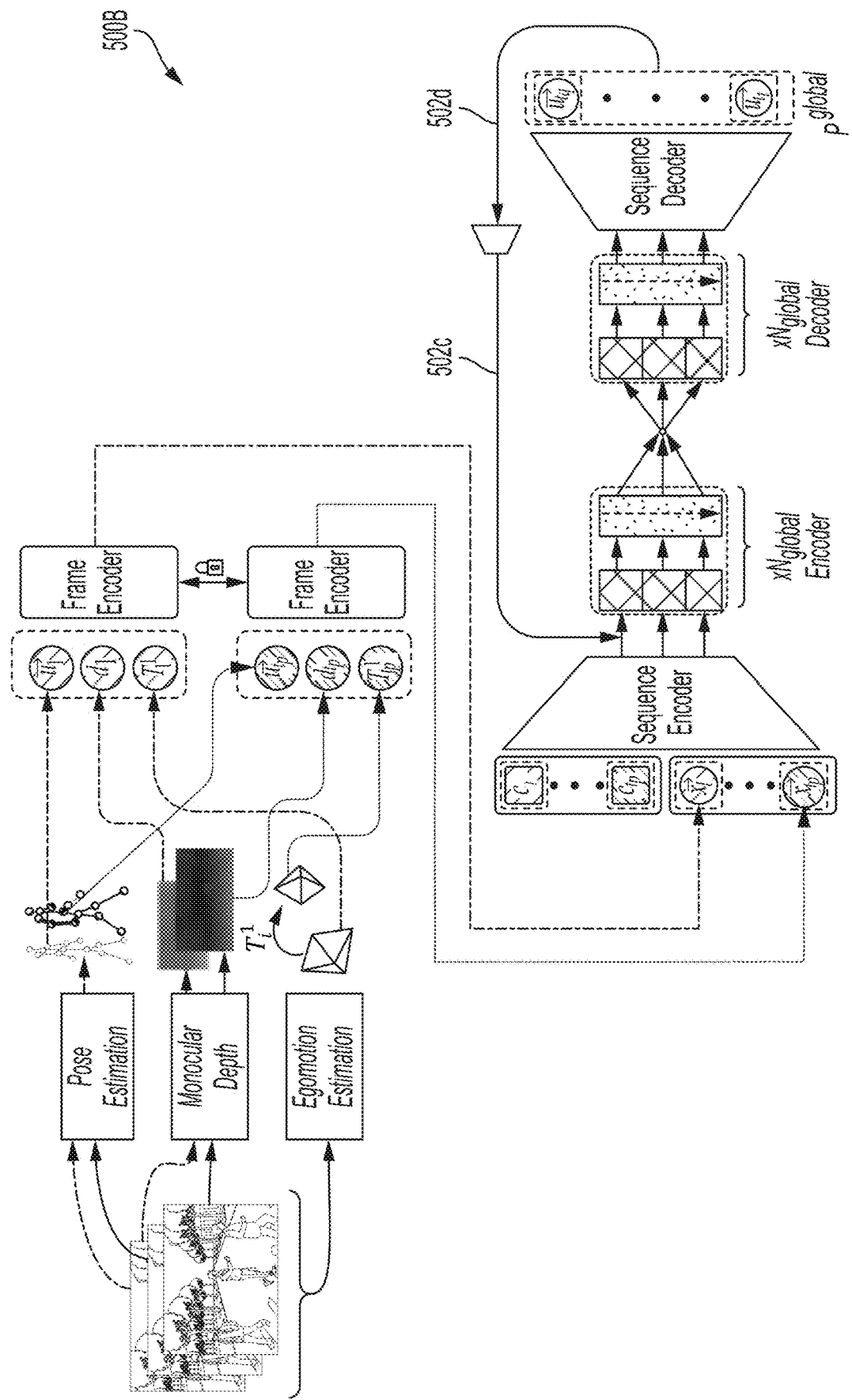
FIG. 5B illustrates an architecture for global stream forecasting, according to aspects of the present disclosure.

FIG. 5A and FIG. 5B respectively illustrate a local architecture 500A for local stream forecasting and a global architecture 500B for global stream forecasting, according to aspects of the present disclosure. The quasi recurrent neural networks in an encoder-recurrent-decoder style pose prediction module include the local architecture 500A and the global architecture 500B.

A quasi recurrent neural network forms the backbone of the sequence-to-sequence learning structure. The quasi recurrent neural network parallelizes efficiently (e.g., relative to an LSTM) due to the quasi recurrent neural network's alternate convolutional and pooling modules. The quasi recurrent neural network also yields faster convergence. The quasi recurrent neural network includes N layers of alternate convolutions and recurrent pooling, both in the input encoder and the output decoder. As illustrated in FIGS. 5A and 5B, the recurrent pooling is a thin aggregation function applied to the convolutional activations.

The encoder churns through the latent representation of the previous poses (poses in the $t_p$ previous time points) and encodes the desired information into a context vector. This vector is then consumed by a decoder part of the quasi recurrent neural network decoder to forecast the future $t_f$ poses. In one aspect, teacher forcing techniques may be used while training to avoid an accumulation of small errors in stream forecasting that destabilizes the training. For example, a preferred outcome may be forced on the system, in accordance with the teacher forcing technique. This is illustrated by the dotted arrow (502a and 502b of FIGS. 5A and 502c and 502d of FIG. 5B) from the output of the decoder back to the input passing through another spatial encoder in FIGS. 5A and 5B.

After being split into separate granularities, the global and local streams are then forecasted separately with different prediction modules. Referring to the local stream forecasting, as shown in FIG. 5A, the filled in and decomposed pose $\{p_j^{local}\}_{j=t-t_p+1}^{t}$ is used as the input to the pose prediction module. This module includes a spatial encoder with the latent dimension $d_{ae}$. The weights of this spatial encoder are separately trained using the auto-encoder while the complexity of the latent space is similar. The forecasting is processed in the latent space with N local layers of the quasi recurrent neural network encoder decoder module.

The latent space is used to forecast because the human pose lies on a low dimensional manifold due to various kinematic constraints enforced by the human body. Thus, forecasting in this lower dimensional denser space makes the prediction easier for the quasi recurrent neural network module. The predicted latent pose is then mapped back into the image space with the spatial decoder to forecast: $\{p_j^{local}\}_{j=t+1}^{j=t+t_f}$ FIG. 5B illustrates an encoder-recurrent-decoder architecture for forecasting global motion stream $p^{global}$. In FIG. 5B the parameters $u_\alpha$ (e.g., $u_1$), $d_\alpha$ (e.g., $d_1$) and $c_\alpha$ (e.g., $c_1$) respectively represent coordinates, estimated monocular depth and confidence in joint $\tilde{I}$ at frame $\alpha$. $T_\alpha^\beta$ represents a scene transformation matrix between frames $\beta$ and $\alpha$. Two frames are considered locked to each other when they share frame encoder weights across different time steps of the input sequence.

Referring to the global stream forecasting, as shown in FIG. 5B, for predicting the global stream, residuals between successive global positions are predicted rather than using absolute coordinates. Having inputs and outputs of the model in this residual space acts similar to normalization of the data and hence results in better performance. Predicting the residuals reduces discontinuity between a last observed input and a first forecasted output. The residuals are forecasted just for the global stream and not for the local stream. This follows because the cyclic or repetitive motion of the local component is not characterized uniquely by just the residuals but needs the phase information too. In contrast, the large global motion is sufficiently approximated just with the residuals.

Thus, starting with $\{\Delta p_j^{global}\}_{j=t-t_p+2}^{t}$, the processing is similar to the local stream but with $N_{global}$ layers of quasi recurrent neural network. Note that $\Delta p_j^{global}$ is the residual value of the poses in the $j^{th}$ time point, defined as $p_j^{global} - p_j^{global}$.

Both streams (local and global) are trained with $l_1$ loss between the predicted pose and the original pose (before completion) weighted by the confidence scores: $c_{i,j=t+1}^{j+t_f}$, of the pre-trained pose detection model in the original detection.

These future predictions are finally recombined to forecast the overall human locomotion $\{p_j\}_{j=t}^{t+t_f}$ as follows:

$$\hat{p}_j = \begin{cases} p_j^{global} & \text{for } i = \bar{\iota} \\ p_j^{global} + p_j^{local,i} & \text{for } i \neq \bar{\iota} \end{cases} \quad 6$$

$$\forall j \in \{t+1, \ldots, t+t_f\} \text{ and } \forall i \in \{1, \ldots, d\}$$

This operation forms the inverse of a splitting procedure because it takes inputs from the two local and global branches and turns them into a single sequence. The predicted outputs are akin to a pedestrian walking in the real-world in the camera image plane.

A keypoint detection scheme may generate dense but noisy frame-level supervision for human poses pt. Aspects of the present disclosure use state-of-the-art models for multiple-person keypoint detection module to autonomously generate dense but noisy frame-level supervision for human poses pt. Manually annotated pose data is used for the task of human locomotion forecasting. In one aspect, pre-trained models are used on task-specific datasets to infer pose and depth for datasets. For each frame in the video, masked frames are created where everything except the pedestrians are masked out using human labelled bounding box annotations. These masked frames are then processed through a pre-trained pose detection model (e.g., OpenPose) to generate pose labels for every pedestrian in the frame.

Using masked full frames for generating frame-level pose supervision is faster and requires significantly lesser storage (e.g., up to 100 times lesser) than processing each cropped out pedestrian one by one without any observable decrease in pose detection accuracy. For an $i^{th}$ joint detected in the $t^{th}$ frame, the pre-trained pose detection model detects two dimensional (2D) coordinates ($u_t^i$, $v_t^i$) and provides a confidence scores $c_t^i$, which is then used for de-noising these detections as described herein. These labelled keypoints form a human pose with multiple joints (e.g., d=25 joints).

A monocular depth estimation implementation is used to autonomously estimate depth in a monocular camera. The monocular depth estimation implementation (e.g., Superdepth) extends a subpixel convolutional layer for depth super-resolution, where high-resolution disparities are synthesized from their corresponding low-resolution convolutional features. The depth estimation model is trained in a self-supervised fashion.

An egomotion estimation implementation based on an unsupervised model is used for autonomously estimating the camera motion that occurs between consecutive frames due to the movement of the ego vehicle. The egomotion estimation implementation can reliably estimate the scene transformation matrix (e.g., $T_i^j$) between frames. It is important that i and j are framed very close to each other (e.g., $\|i-j\| \leq 5$ in a 30 frames per second (fps) video) and that time horizons relevant for prediction are large (~30 frames). In one aspects, estimates between different overlapping short windows are combined or chained to obtain $T_{i+k}^i$ for k>5. An increase in k introduces a noise source that is accounted for according to aspects of the present disclosure.

Figure 6:
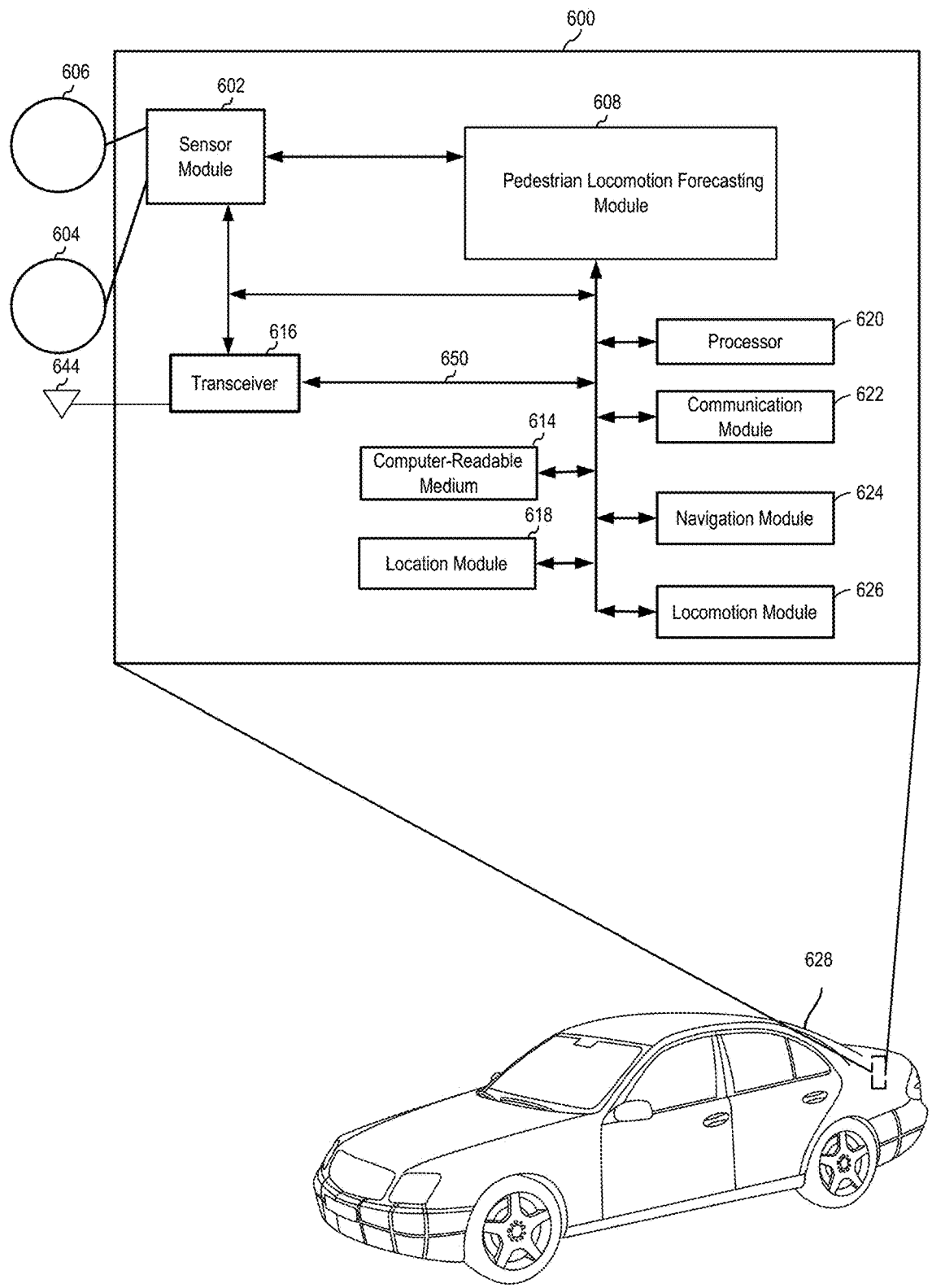
FIG. 6 is a diagram illustrating an example of a hardware implementation for disentangling human dynamics for pedestrian locomotion forecasting with noisy supervision, according to aspects of the present disclosure.

FIG. 6 is a diagram illustrating an example of a hardware implementation for a pedestrian locomotion forecasting system 600, according to aspects of the present disclosure. The pedestrian locomotion forecasting system 600 may be a component of a vehicle, a robotic device, or another device. For example, as shown in FIG. 3, the pedestrian locomotion forecasting system 600 is a component of an autonomous vehicle 628. Although the pedestrian locomotion forecasting system 600 is located in the back of the autonomous vehicle 628, the pedestrian locomotion forecasting system 600 may be located anywhere in the vehicle (e.g., the front of the vehicle). Aspects of the present disclosure are not limited to the autonomous vehicle 628, as other devices, such as a bus, boat, drone, or robot, are also contemplated for using the pedestrian locomotion forecasting system 600. The autonomous vehicle 628 may be autonomous or semi-autonomous.

The pedestrian locomotion forecasting system 600 may be implemented with a bus architecture, represented generally by a bus 650. The bus 650 may include any number of interconnecting buses and bridges depending on the specific application of the pedestrian locomotion forecasting system 600 and the overall design constraints. The bus 650 links together various circuits including one or more processors and/or hardware modules, represented by a processor 620, a communication module 622, a location module 618, a sensor module 602, a locomotion module 626, a navigation module 624, a computer-readable medium 614, and a pedestrian locomotion forecasting module 608. In some aspects, the pedestrian locomotion forecasting module 608 is part of the processor 620. The bus 650 may also link various other circuits such as timing sources, peripherals, voltage regulators, and power management circuits, which are well known in the art, and therefore, will not be described any further.

The pedestrian locomotion forecasting system 600 includes a transceiver 616 coupled to the processor 620, the sensor module 602, the pedestrian locomotion forecasting module 608, the communication module 622, the location module 618, the locomotion module 626, the navigation module 624, and the computer-readable medium 614. The transceiver 616 is coupled to an antenna 644. The transceiver 616 communicates with various other devices over a transmission medium. For example, the transceiver 616 may receive commands via transmissions from a user or a remote device. As another example, the transceiver 616 may transmit data (e.g., driving statistics and information, environmental information and other desirable information) from the pedestrian locomotion forecasting module 608 to a server (not shown) or vice versa in order to optimize the system.

The pedestrian locomotion forecasting system 600 includes the processor 620 coupled to the computer-readable medium 614. The processor 620 performs processing, including the execution of software stored on the computer-readable medium 614 providing functionality according to the disclosure. The software, when executed by the processor 620, causes the pedestrian locomotion forecasting system 600 to perform the various functions described for a particular device, such as the autonomous vehicle 628, or any of the modules 602, 614, 616, 618, 620, 622, 624, 626. The computer-readable medium 614 may also be used for storing data that is manipulated by the processor 620 when executing the software.

The sensor module 602 may obtain measurements or environmental information via different sensors, such as a first sensor 306 and a second sensor 604. For example, the sensors (e.g., camera or video recorder) may capture raw video and/or pictures of pedestrians and provide them to the pedestrian locomotion forecasting module 608. Of course, aspects of the present disclosure are not limited to the aforementioned sensors as other types of sensors are also contemplated for either of the sensors 604, 606.

The measurements of the first sensor 606 and the second sensor 604 may be processed by one or more of the processor 620, the sensor module 602, the communication module 622, the location module 618, the pedestrian locomotion forecasting module 608, the locomotion module 626, and the navigation module 624, in conjunction with the computer-readable medium 614, to implement the functionality described herein. In one configuration, the data captured by the first sensor 606 and the second sensor 604 may be transmitted to an external device via the transceiver 616. The first sensor 606 and the second sensor 604 may be coupled to the autonomous vehicle 628 or may be in communication with the autonomous vehicle 628.

The location module 618 may determine a location of the autonomous vehicle 628. For example, the location module 618 may use a global positioning system (GPS) to determine the location of the autonomous vehicle 628. The communication module 622 may facilitate communications via the transceiver 616. For example, the communication module 622 may be configured to provide communication capabilities via different wireless protocols, such as WiFi, long term evolution (LTE), 4G, 5G, etc. The communication module 622 may also be used to communicate with other components of the autonomous vehicle 628 that are not modules of the pedestrian locomotion forecasting system 600.

The locomotion module 626 may facilitate locomotion of the autonomous vehicle 628. As an example, the locomotion module 626 may control the movement of the wheels. As another example, the locomotion module 626 may be in communication with a power source of the autonomous vehicle 628, such as an engine or batteries. Of course, aspects of the present disclosure are not limited to providing locomotion via wheels and are contemplated for other types of components for providing locomotion, such as propellers, treads, fins, and/or jet engines.

The pedestrian locomotion forecasting system 600 also includes the navigation module 624 for planning a route or controlling the locomotion of the autonomous vehicle 628, via the locomotion module 626. The navigation module 624 may be in communication with the pedestrian locomotion forecasting module 608, the sensor module 602, the transceiver 616, the processor 620, the communication module 622, the location module 618, the locomotion module 626, and the computer-readable medium 614.

The modules may be software modules running in the processor 620, resident/stored in the computer-readable medium 614, one or more hardware modules coupled to the processor 620, or some combination thereof.

According to aspects of the present disclosure, the pedestrian locomotion forecasting system 600 includes a pedestrian locomotion forecasting module 608 in communication with the navigation module 624, the sensor module 602, the transceiver 616, the processor 620, the communication module 622, the location module 618, the locomotion module 626, and the computer-readable medium 614.

In one configuration, the pedestrian locomotion forecasting module 608 generates a dense but noisy frame-level supervision for human poses. The pedestrian locomotion forecasting module 608 suppresses noise and fills missing joints of the human body using a pose completion module. The pedestrian locomotion forecasting module 608 splits the poses into global and local streams. The pedestrian locomotion forecasting module 608 combines the global and local streams to forecast future human locomotion.

Figure 7:
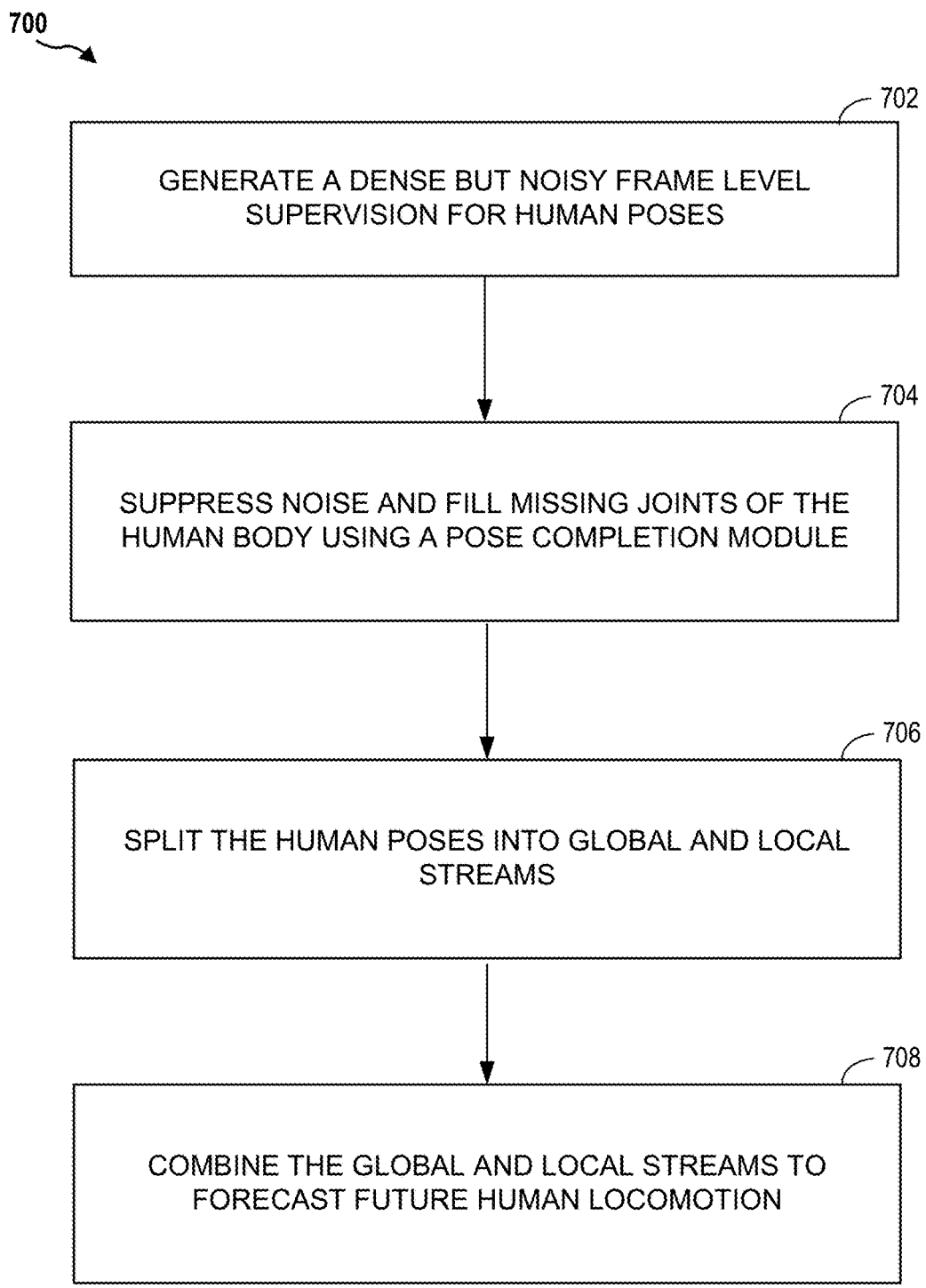
FIG. 7 illustrates a method for disentangling human dynamics for pedestrian locomotion forecasting with noisy supervision, according to an aspect of the present disclosure.

FIG. 7 illustrates a method 700 for predicting spatial positions of several key points on a human body in the near future in an egocentric setting, according to an aspect of the present disclosure. As shown in FIG. 7, at block 702, an ego vehicle (e.g., a pedestrian locomotion forecasting module of the ego vehicle) generates a frame-level supervision for human poses. At block 704, the ego vehicle suppresses noise and fills missing joints of the human body using a pose completion module. At block 706, the ego vehicle splits the poses into a global and a local stream. At block 708, the ego vehicle combines the global stream and the local stream to forecast future human locomotion.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for predicting spatial positions of several key points on a human body in the near future in an egocentric setting, comprising:
    generating a frame-level supervision for human poses of a pedestrian;
    suppressing noise and filling missing joints of the human body of the pedestrian using a pose completion module;
    splitting the concurrent motion of the joints of the pedestrian into a global stream and a local stream, in which the global motion stream models large scale movements of a position of the pedestrian with respect to a camera of a vehicle;
    encoding, by the local stream, a motion of the human body of the pedestrian with respect to the global stream;
    capturing a depth change of an overall pose size and movement of different joints of the human body of the pedestrian; and
    combining the global stream and the local stream to forecast future human locomotion of the pedestrian based on the depth change of the overall pose size and movement of different joints of the human body of the pedestrian.

2. The method of claim 1, further comprising forecasting the global stream based on one joint of the human body of the pedestrian.

3. The method of claim 1, in which an architecture of a forecaster of the local stream is different from an architecture of a forecaster of the global stream.

4. The method of claim 1, further comprising estimating motion between consecutive frames due to a motion of an ego vehicle.

5. A non-transitory computer-readable medium having program code recorded thereon for predicting spatial positions of several key points on a human body in the near future in an egocentric setting, the program code being executed by a processor and comprising:
    program code to generate a frame-level supervision for human poses of a pedestrian;
    program code to suppress noise and filling missing joints of the human body of the pedestrian using a pose completion module;
    program code to split the concurrent motion of the joints of the pedestrian into a global stream and a local stream, in which the global motion stream models large scale movements of a position of the pedestrian with respect to a camera of a vehicle;
    program code to encode, by the local stream, a motion of the human body of the pedestrian with respect to the global stream;
    program code to capture a depth change of an overall pose size and movement of different joints of the human body of the pedestrian; and
    program code to combine the global stream and the local stream to forecast future human locomotion of the pedestrian based on the depth change of the overall pose size and movement of different joints of the human body of the pedestrian.

6. The non-transitory computer-readable medium of claim 5, further comprising program code to forecast the global stream based on one joint of the human body of the pedestrian.

7. The non-transitory computer-readable medium of claim 5, in which an architecture of a forecaster of the local stream is different from an architecture of a forecaster of the global stream.

8. The non-transitory computer-readable medium of claim 5, further comprising program code to estimate motion between consecutive frames due to a motion of an ego vehicle.

9. A system for predicting spatial positions of several key points on a human body in the near future in an egocentric setting, the system comprising:
    a memory; and
    at least one processor, the at least one processor configured:
        to generate a frame-level supervision for human poses of a pedestrian;
        to suppress noise and filling missing joints of the human body of the pedestrian using a pose completion module;
        to split the concurrent motion of the joints of the pedestrian into a global stream and a local stream, in which the global motion stream models large scale movements of a position of the pedestrian with respect to a camera of a vehicle;
        to encode, by the local stream, a motion of the human body of the pedestrian with respect to the global stream;
        to capture a depth change of an overall pose size and movement of different joints of the human body of the pedestrian; and
        to combine the global stream and the local stream to forecast future human locomotion of the pedestrian based on the depth change of the overall pose size and movement of different joints of the human body of the pedestrian.

10. The system of claim 9, in which the at least one processor is further configured to forecast the global stream based on one joint of the human body of the pedestrian.

11. The system of claim 9, in which an architecture of a forecaster of the local stream is different from an architecture of a forecaster of the global stream.

* * * * *